(12) United States Patent
Takahashi

(10) Patent No.: US 6,724,497 B1
(45) Date of Patent: Apr. 20, 2004

(54) IMAGE PROCESSING DEVICE WHICH CAN PERFORM A PLURALITY OF TYPES OF IMAGE PROCESSING AT HIGH SPEED

(75) Inventor: Yuji Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/484,254

(22) Filed: Jan. 18, 2000

(30) Foreign Application Priority Data

Feb. 1, 1999 (JP) .......................................... 11-023326

(51) Int. Cl.[7] .............................................. G06K 15/00
(52) U.S. Cl. ...................... 358/1.15; 358/1.16; 358/474
(58) Field of Search .......................... 358/1.1, 1.2, 1.9, 358/1.13, 1.15, 1.16, 1.17, 474, 401, 486; 382/168, 171, 302, 303, 304, 307; 712/9, 11, 28, 31

(56) References Cited

U.S. PATENT DOCUMENTS

| | | | | |
|---|---|---|---|---|
| 5,073,868 A | * | 12/1991 | Tada | 358/1.13 |
| 5,157,739 A | * | 10/1992 | Masaki et al. | 382/307 |
| 5,701,505 A | * | 12/1997 | Yamashita et al. | 712/11 |
| 5,926,292 A | * | 7/1999 | Ishikawa et al. | 358/534 |
| 5,982,395 A | * | 11/1999 | Olson et al. | 345/572 |
| 6,449,390 B1 | * | 9/2002 | Inoue | 382/168 |
| 6,477,281 B2 | * | 11/2002 | Mita et al. | 382/248 |

FOREIGN PATENT DOCUMENTS

JP          6-98165          4/1994

* cited by examiner

Primary Examiner—Gabriel Garcia
(74) Attorney, Agent, or Firm—Oblon, Spivak, McClelland, Maier & Neustadt, P.C.

(57) ABSTRACT

A first image processing portion, using respective synchronization signals for 'n' blocks of image data, performs first predetermined image processing on the image data. A second image processing portion combines the 'n' blocks of image data in line units, and performs second predetermined image processing on the image data using synchronization signals, the period of each of which is 'n' times the period of each of the respective synchronization signals. A third image processing portion again divides each line of image data into 'n' blocks of image data, and performs third predetermined image processing on the image data using the respective synchronization signals, the period of each of which is the original period.

6 Claims, 19 Drawing Sheets

FIG.9
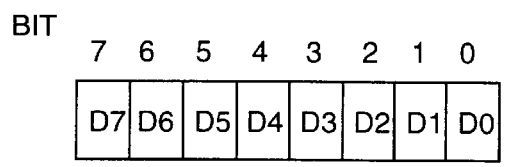
FIG.10A
FIG.10B
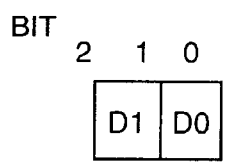
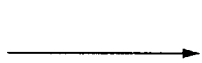
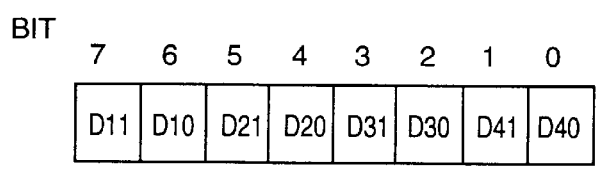

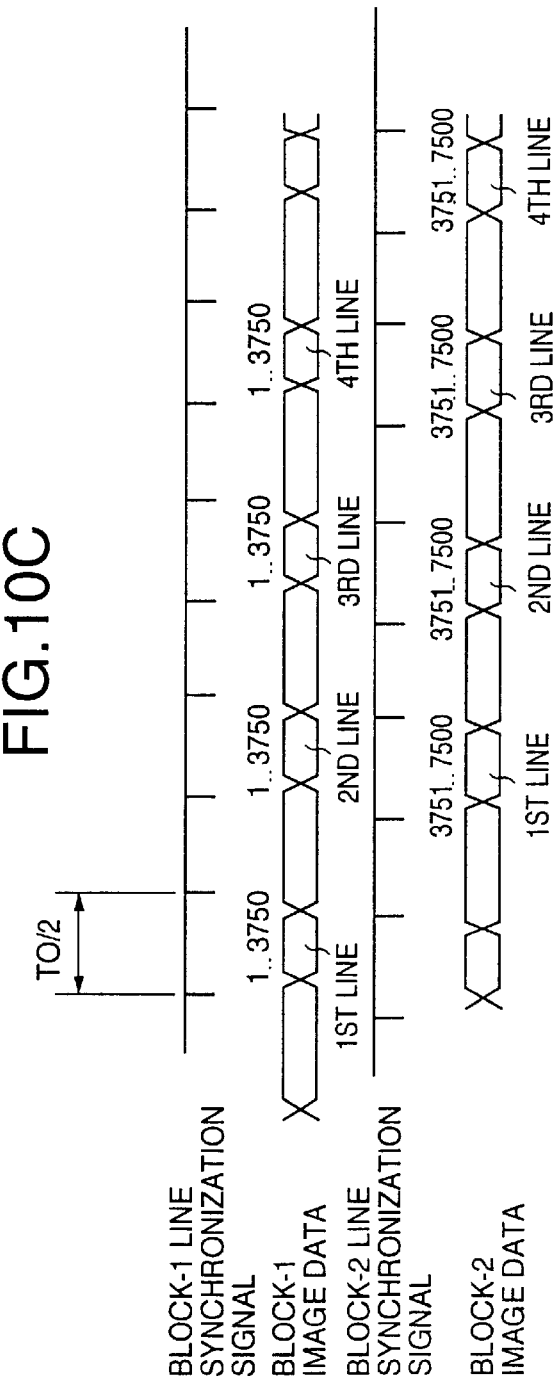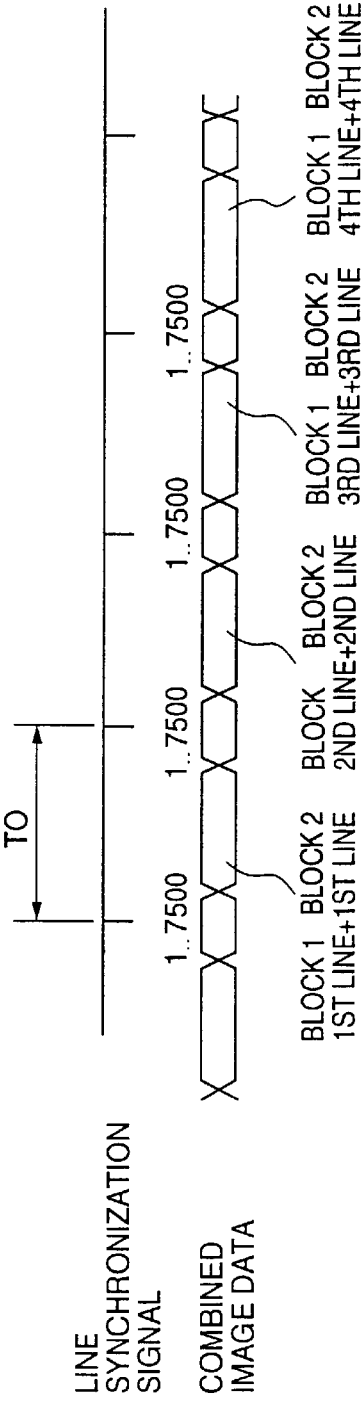

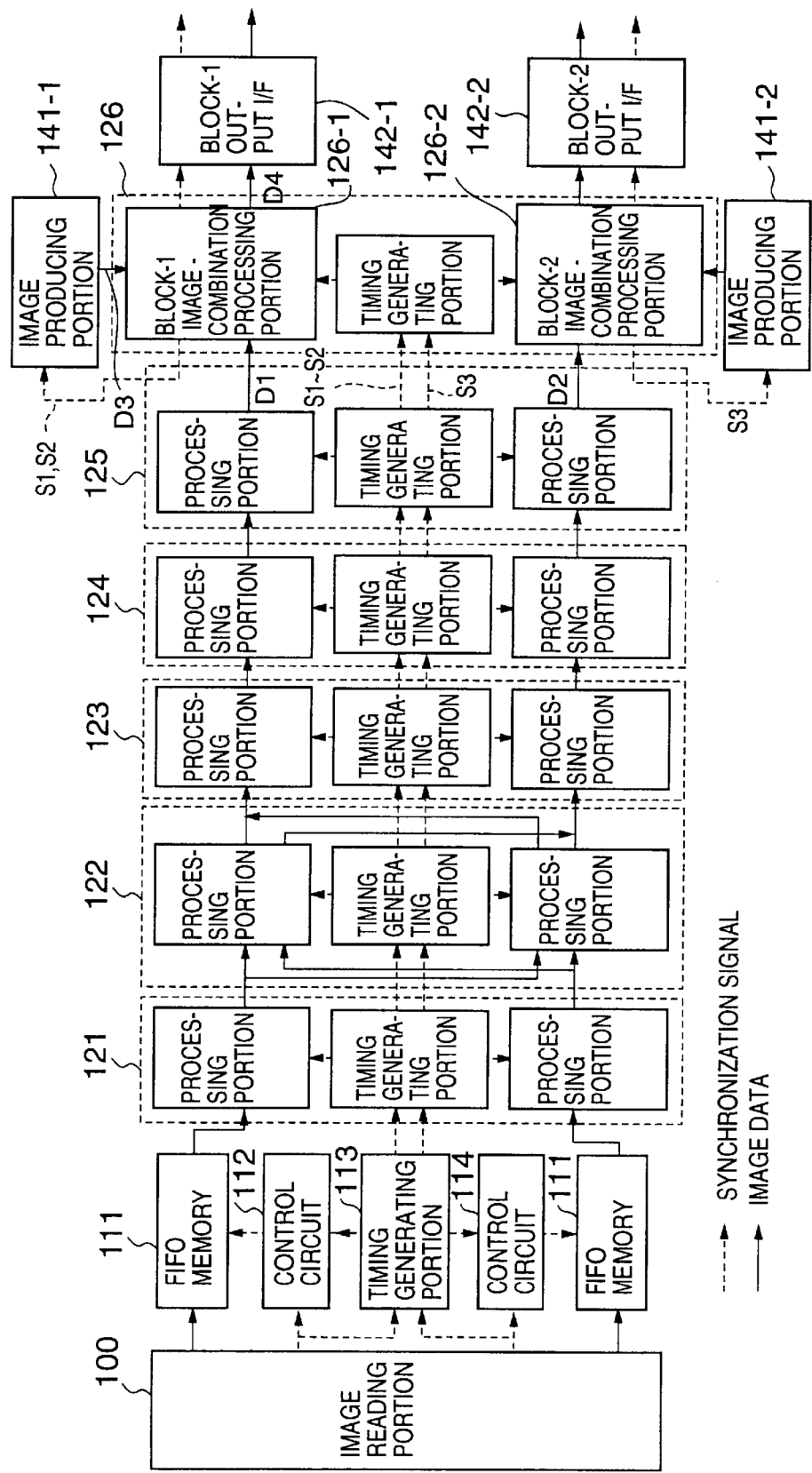

FIG.17
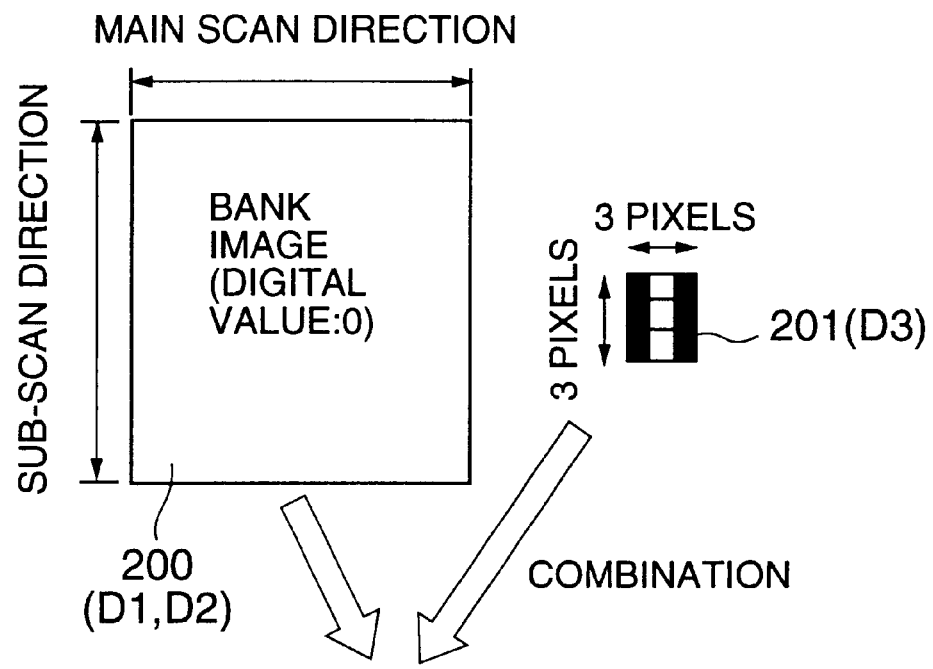
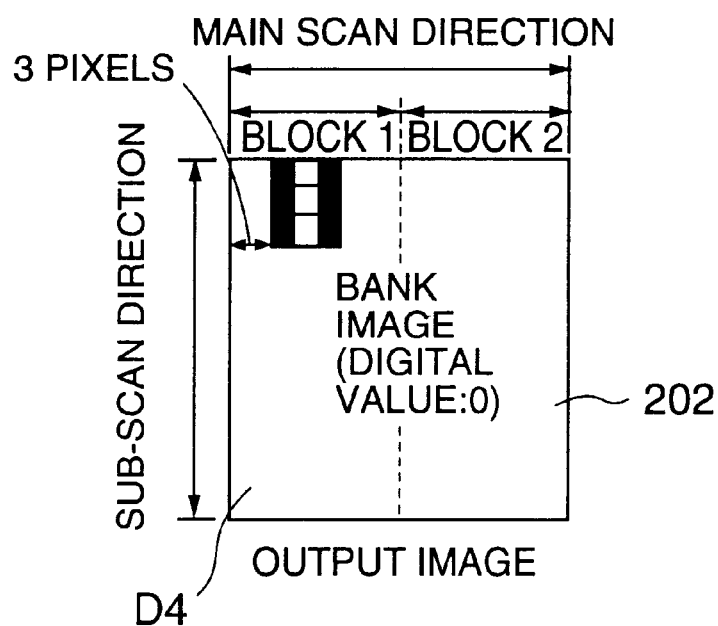

IMAGE PROCESSING DEVICE WHICH CAN PERFORM A PLURALITY OF TYPES OF IMAGE PROCESSING AT HIGH SPEED

BACKGROUND OF THE INVENTION

1. Field of the Invention

The present invention generally relates to an image processing device which is applied to a scanner, a facsimile machine, a copier and so forth, and, in particular, to a high-speed image processing technique.

2. Description of the Prior Art

Recently, the image data processing speed has been increased in a digital copier, a scanner and so forth. In order to achieve high-speed image data processing, it is necessary that an original image is rapidly read, and image processing is performed on thus-obtained image data at high speed. However, when the frequency of the pixel clock is increased, reliability may decrease due to heat generated in circuits, and/or lack of operation margin. Further, trouble due to radio wave may occur.

Therefore, a method for increasing the image data processing speed without increasing the frequency of the pixel clock has been devised. For example, Japanese Laid-Open patent application Ser. No. 6-98165 discloses a technique in which one page of image data is divided in the main scan direction into a plurality of blocks, the blocks of image data are processed in parallel, and the image data which is once divided to the blocks is returned to line units, so that image data processing for a plurality of blocks is performed easily.

In the above-described prior art, a line is divided into blocks, and the respective blocks of image data are processed using the same synchronization signal. Accordingly, it is not possible to perform a plurality of types of image processing in a condition in which each type of image processing is performed in parallel.

In the specification and claims of the present application, each of the terms 'line', 'line of data' and 'line of image data' means a series of image data corresponding to a row of pixels arranged in the main scan direction, a page of image being obtained as a result of a plurality of rows of pixels being arranged in the sub-scan direction.

SUMMARY OF THE INVENTION

An object of the present invention is to provide an image processing device which can perform a plurality of types of image processing at high speed.

In order to achieve this object, an image processing device, according to the present invention, which receives image data from an image reading device which divides each line of image data into 'n' blocks of image data, the 'n' being an arbitrary number, and transfers the 'n' blocks of image data in synchronization with respective synchronization signals, and performs predetermined image processing on the image data received from the image reading device, comprises:

a first image processing portion which, using respective synchronization signals for the 'n' blocks of image data, performs first predetermined image processing on the image data in parallel; and a second image processing portion which combines the 'n' blocks of image data in line units, and performs second predetermined image processing on the image data in parallel using synchronization signals, the period of each of which is 'n' times the period of each of the respective synchronization signals used by the first image processing portion.

In this arrangement, first, using the respective synchronization signals for the 'n' blocks of image data, the first predetermined image processing is performed on the image data in parallel. Then, the 'n' blocks of image data are combined in line units, and the second predetermined image processing is performed on the thus-obtained image data in parallel using the synchronization signals, the period of each of which is 'n' times the period of each of the respective synchronization signals used by the first image processing portion. This enables parallel processing suitable for each image processing, and, as a result, it is possible to achieve high-speed image processing.

The image processing device may further comprise:

a third image processing portion which again divides each line of image data into 'n' blocks of image data, and performs third predetermined image processing on the thus-obtained image data in parallel using respective synchronization signals, the period of each of which is the original period; and a line-data obtaining portion which converts the 'n' blocks of image data output from the third image processing portion into parallel data so as to reduce the period of each of the respective synchronization signals for the 'n' blocks of image data so that the period becomes 1/n times the original one, and, also, to decrease the frequency of a pixel clock, thus the 'n' blocks of image data being transferred in synchronization with the respective synchronization signals, the period of each of which is 1/n times the original one, then combines the 'n' blocks of image data, and, thus, obtains each line of image data which is transferred in synchronization with a synchronization signal, the period of which is the original one, and in synchronization with the pixel clock, the frequency of which is reduced.

In this arrangement, each line of image data is again divided into 'n' blocks of image data, and the third predetermined image processing is performed on the thus-obtained image data in parallel using the respective synchronization signals, the period of each of which is the original period. Then, the 'n' blocks of image data are converted into parallel data so as to decrease the period of each of the respective synchronization signals of the 'n' blocks of image data to be 1/n times the original one, and, also, to reduce the frequency of the pixel clock, the 'n' blocks of image data being thus transferred in synchronization with the respective synchronization signals, the period of each of which is 1/n times the above-mentioned original one, then, the 'n' blocks of image data are combined, and, thus, each line of image data is obtained, which is transferred in synchronization with the synchronization signal, the period of which is the above-mentioned original one, and in synchronization with the pixel clock, the frequency of which is reduced. Thereby, when the thus-obtained image data is transferred to a subsequent stage, the subsequent stage can perform one-line processing without considering the block division. As a result, the control becomes easier. Further, as a result of the frequency of the pixel clock being decreased, a possibility that problematic radiation noise develops is reduced.

An image processing device, according to another aspect of the present invention, which receives image data from an image reading device which divides each line of image data into 'n' blocks of image data, the 'n' being an arbitrary number, and transfers the 'n' blocks of image data in synchronization with respective synchronization signals, comprises:

an image processing portion which performs predetermined image processing on the image data, and comprises a first processing portion which, using respective synchronization signals for the 'n' blocks of image data, performs first predetermined image processing on the image data in parallel, and a second processing portion which combines the 'n' blocks of image data in line units, and performs second predetermined image processing on the image data in parallel using synchronization signals, the period of each of which is 'n' times the period of each of the respective synchronization signals; and an image-combination processing portion which performs processing of combining image data produced by an image producing portion and the image data output from the image processing portion.

Thereby, it is possible to combine the image data, registered in the image producing portion, with the image data, obtained as a result of each line being divided into 'n' blocks, at an arbitrary position of the image.

The image processing portion may further comprises a third processing portion which again divides each line of image data into 'n' blocks of image data, and performs third predetermined image processing on the thus-obtained image data in parallel using respective synchronization signals, the period of each of which is the original period; and the image-combination processing portion may perform the processing of combining the image data produced by the image producing portion and the image data which is obtained as a result of the 'n' blocks of image data output from the third processing portion of the image processing portion being converted into parallel data so as to reduce the period of each of the respective synchronization signals of the 'n' blocks of image data to 1/n times the original one, and, also, to reduce the frequency of a pixel clock, the 'n' blocks of image data being thus in synchronization with the respective synchronization signals, the period of each of which is 1/n times the original one, the 'n' blocks of image data being then combined, and each line of image data being obtained, which is in synchronization with a synchronization signal, the period of which is the original one, and in synchronization with the pixel clock, the frequency of which is reduced.

In this arrangement, only the single image producing portion is needed. As a result, it is possible to lower the costs.

The image processing device may further comprise an input interface for inputting image data to the image producing portion. Thereby, it is possible to register an arbitrary image data in the image producing portion in arbitrary timing, and perform image combination using the thus-registered image data.

A single data bus may be used for inputting the image data to the image producing portion, and, also, for outputting the image data from the image producing portion. Thereby, when the image producing portion and the image processing device including all the portions other than the image producing portion are included in separate circuit blocks, respectively, it is possible to reduce the number of wiring members between these two circuit blocks. As a result, it is possible to lower the costs.

Other objects and further features of the present invention will become more apparent from the following detailed description when read in conjunction with the accompanying drawings.

BRIEF DESCRIPTION OF THE DRAWINGS

FIG. 9 shows a bit arrangement of image data for one pixel;

FIG. 10A shows a bit arrangement of image data for one pixel after image processing is performed on the image data through an image processing portion shown in FIGS. 1 and 2;

FIG. 10B shows a bit arrangement of image data when the image data is transferred in parallel;

FIG. 10C shows timing of data in a line-data obtaining portion shown in FIG. 2;

FIG. 10D shows timing of data output from the line-data obtaining portion;

FIG. 11 shows a block diagram of an image processing device in a third embodiment of the present invention;

FIG. 17 illustrates one example of image combination;

DETAILED DESCRIPTION OF PREFERRED EMBODIMENTS

Embodiments of the present invention will now be described making reference to drawings.

Figure 1:
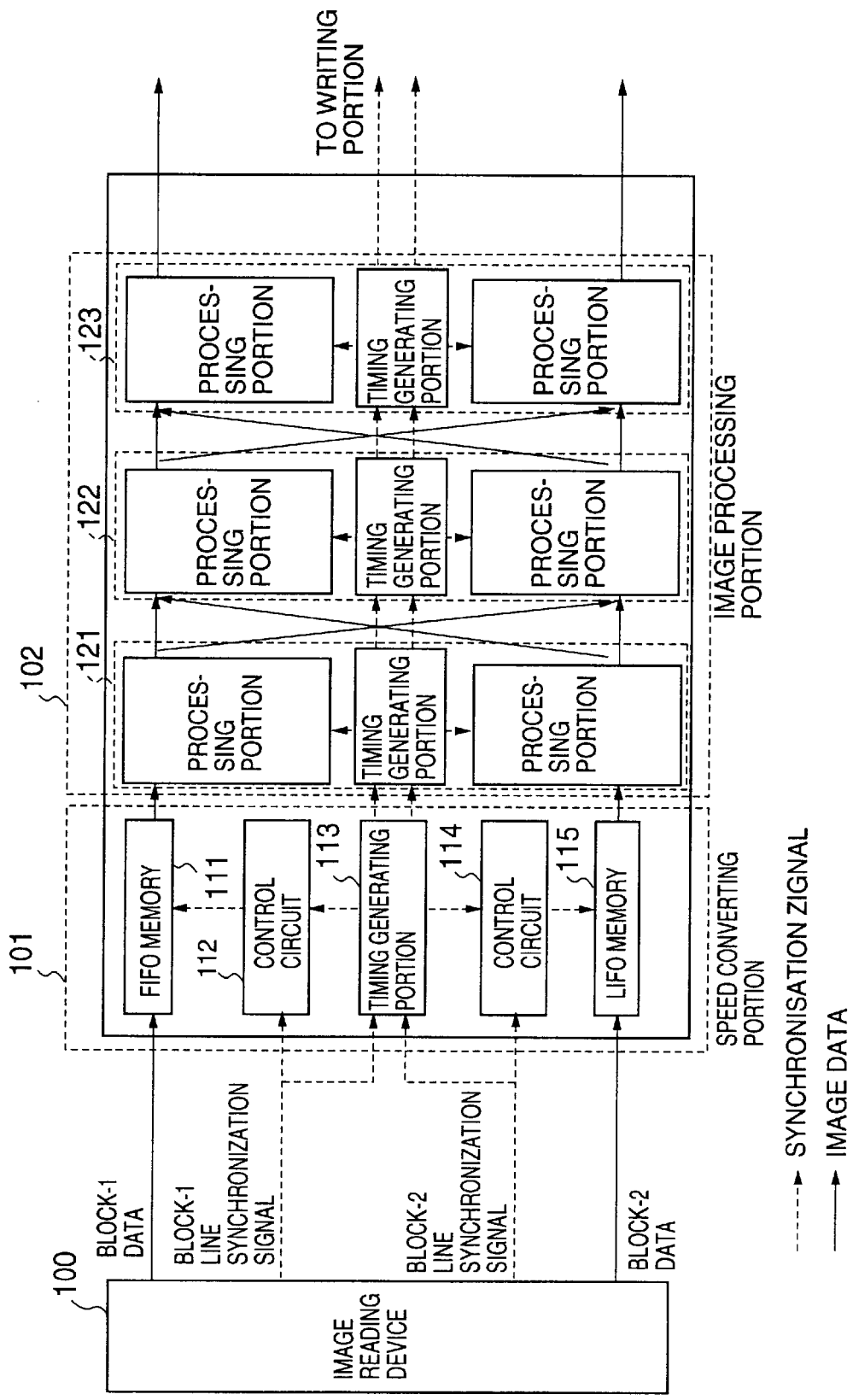
FIG. 1 is a block diagram of an image processing device in a first embodiment of the present invention.

FIG. 1 is a block diagram of an image processing device in a first embodiment of the present invention. The image processing device including a speed converting portion 101 and an image processing portion 102 is provided subsequent to an image reading device 100.

The speed converting portion 101 includes a FIFO (First-In First-Out) memory 111, a first control circuit 112, a timing generating portion 113, a second control circuit 114, and a LIFO (Last-In First-Out) memory 115.

Figure 6:
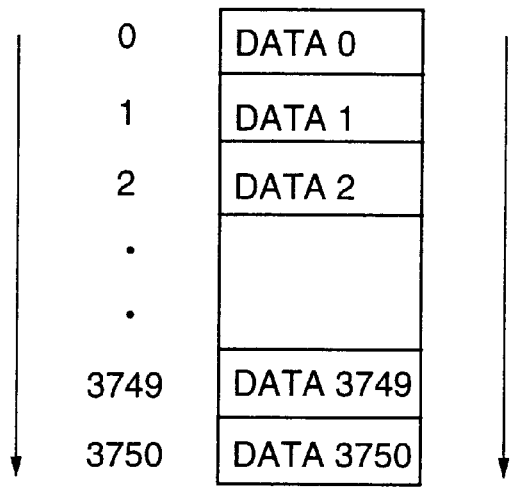
FIG. 6 illustrates operation of a FIFO memory shown in FIGS. 1 and 2.
Figure 7:
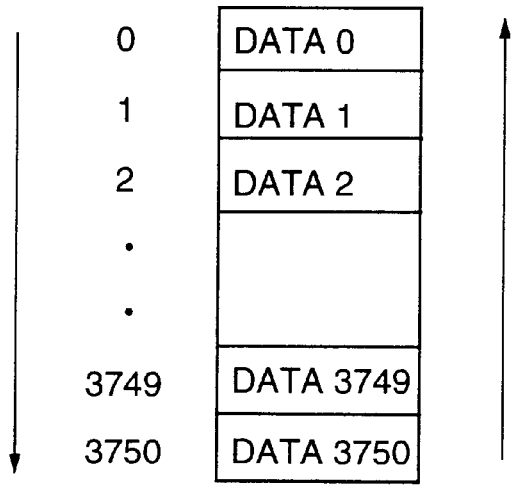
FIG. 7 illustrates operation of a LIFO memory shown in FIGS. 1 and 2.

FIG. 6 illustrates operation of the FIFO memory 111, and FIG. 7 illustrates operation of the LIFO memory 115.

As shown in these figures, the FIFO memory 111 is a memory which outputs data in the order in which the data has been input. The LIFO memory 115 is a memory which outputs data in the order reverse to the order in which the data has been input.

The image processing portion 102 includes a first image processing portion 121, a second image processing portion 122 and a third image processing portion 123. Each of these image processing portions includes a pair of processing portions and a time generating portion, as shown in the figure. The pair of processing portions perform particular image processing on input image data in parallel. The time generating portion receives line synchronization signals from the preceding stage, generates appropriate line synchronization signals and provides them to the pair of processing portions, respectively, and to the subsequent stage.

In the first embodiment, each line of image data is divided into two blocks of image data, that is, a block 1 (first half) and a block 2 (latter half).

Figure 3:
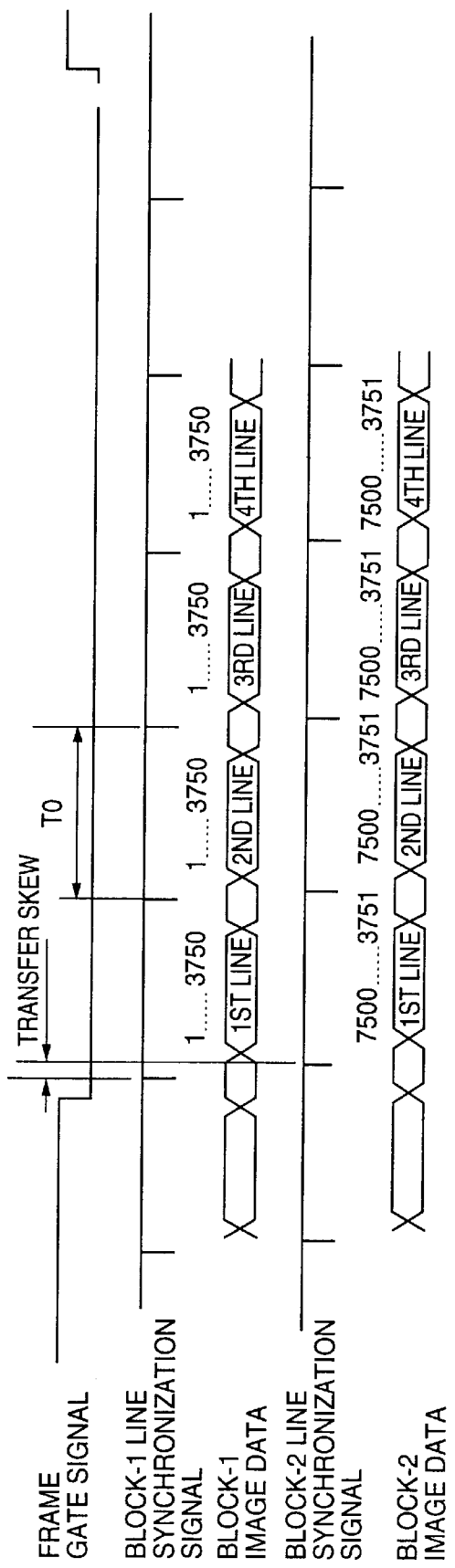
FIG. 3 shows timing of data output from an image reading device shown in FIGS. 1 and 2.
Figure 4:
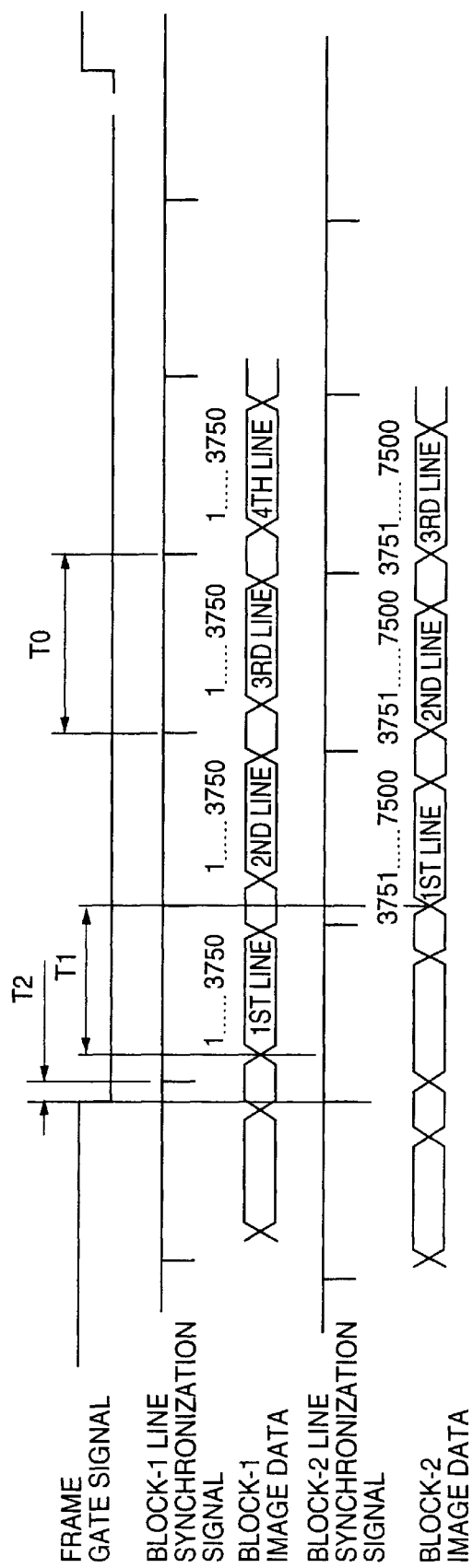
FIG. 4 shows timing of data after speed conversion is performed on the data and signals shown in FIG. 3 by a speed converting portion shown in FIGS. 1 and 2.

FIG. 3 shows timing of data output from the image reading device 100, and FIG. 4 shows timing of data after speed conversion through the speed converting portion 101.

First, the timing of data output from the image reading device 100 will now be described. In FIG. 3, the length of each line is 7500 pixels, and each of the block 1 and block 2 has 3750 pixels as a result of one line being divided into the two blocks. The image processing device receives the respective blocks of image data and line synchronization signals for the respective blocks. A frame gate signal expressing the length of one page is common to the respective blocks.

In the first embodiment, the image reading device 100 outputs the block 2 of image data in the condition in which the sequence of the image data is reversed (from the 7500th pixel to the 3751th pixel) as shown in FIG. 3 due to the specification of the image reading device 100.

The block 1 of image data and the line synchronization signal therefor, and the block 2 of image data and the line synchronization signal therefor are input, respectively, from the image reading device 100 to the speed converting portion 101.

The block 1 of data is input to the FIFO memory 111 in synchronization with a line synchronization signal therefor, and the block 2 of data is input to the LIFO memory 115 in synchronization with a line synchronization signal therefor. Each of the FIFO memory 111 and LIFO memory 115 has the storage capacity for the size of each block (in this embodiment, the half of one line of image data).

As shown in FIG. 4, the block 1 of data is read out from the FIFO memory 111 in synchronization with the line synchronization signal generated by the timing generating portion 113 in the speed converting portion 101. Similarly, the block 2 of data is read out from the LIFO memory 115 in synchronization with the line synchronization signal generated by the timing generating portion 113 in the speed converting portion 101. Because the block 2 of data is read out from the LIFO memory 115 in the reverse order, reading out can be started after the block of data is completely written in the LIFO memory 115. Therefore, output of the data is delayed for one period (T1 of FIG. 4) of the line synchronization signal.

Further, because reading out of the data needs to be performed before writing of the subsequent data is performed, the line synchronization signal for the block 2 is earlier than the line synchronization signal for the block 1 (T2 of FIG. 4). (The writing order and reading order for the LIFO are reversed each time when the cycle of writing and reading is finished.) Thereby, in the first image processing portion 121, the line synchronization signal for the block 1 and timing of the block 1 of data, and the line synchronization signal for the block 2 and timing of the block 2 of data are in an asynchronous condition. Because the pair of processing portions of the first image processing portion 121 perform data processing for the two blocks respectively and independently, no problem occurs. In the first embodiment, the first image processing portion 121 performs shading processing and γ correction on the input image data in a well-known manner but in parallel through the pair of processing portions for the block 1 and block 2, respectively.

Figure 5:
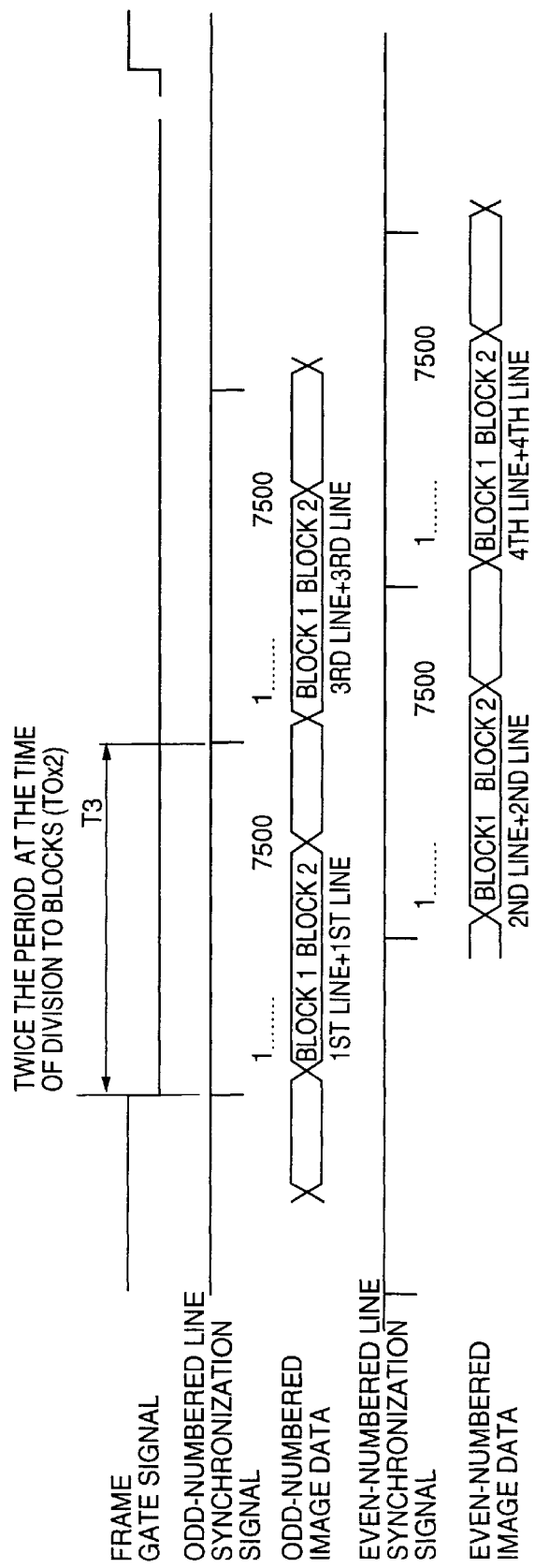
FIG. 5 shows timing of data in a second image processing portion.

FIG. 5 shows timing of data in the second image processing portion 122.

The second image processing portion 122 performs image processing in line units such as the magnifying processing in the prior art. Therefore, as shown in FIG. 5, the block 1 of data and block 2 of data are combined so that one line of image data is obtained. In this case, the period of each of line synchronization signals is doubled (T3 in FIG. 5) so that it is not necessary to increase the frequency of the pixel clock from the original one. (Although not shown in the figures, the pixel clock is provided to all the portions of the image processing device from a pixel-clock generating portion, also not shown in the figures.) Further, the even-numbered line of image data and the odd-numbered line of image data are processed in parallel by the pair of processing portions of the second image processing portion 122, respectively. In the first embodiment, the second image processing portion 122 performs reduction/magnification processing on the input image data in a well-known manner but in parallel through the pair of the processing portions for the even-numbered line and odd-numbered line, respectively.

Figure 8:
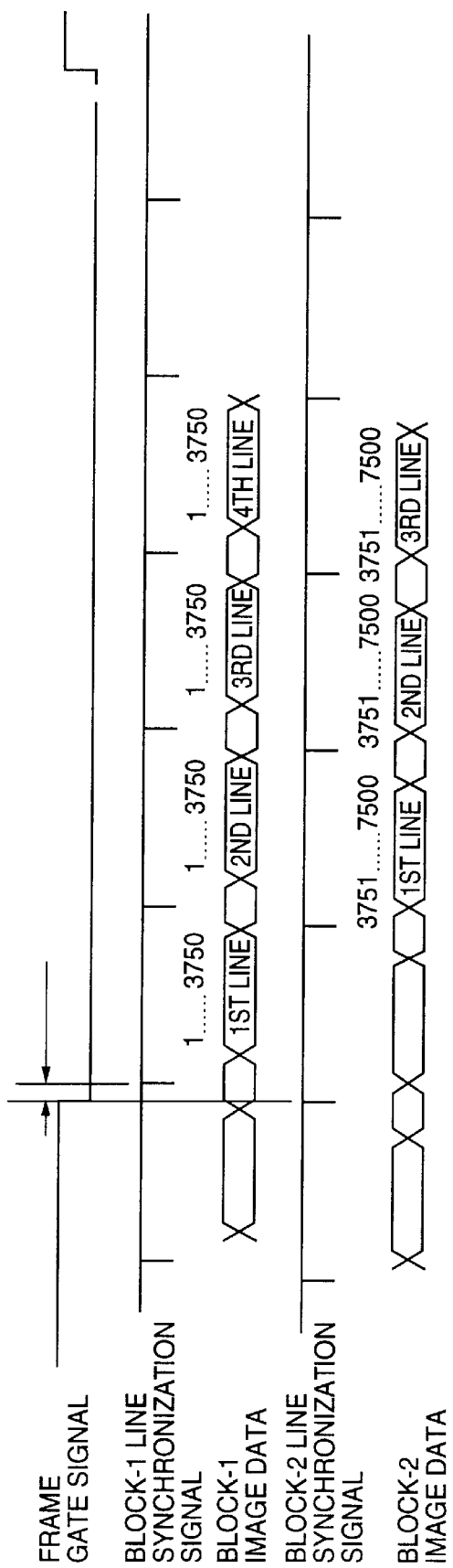
FIG. 8 shows timing of data in a third image processing portion.

FIG. 8 shows timing of data in the third image processing portion 123.

Image processing performed in the third image processing portion 123 is again processing performed in block units. Therefore, each line of image data is divided into the block 1 of image data and block 2 of image data, and processing is performed thereon. In the first embodiment, the third image processing portion 123 performs filtering processing, that is, MTF correction/smoothing processing on the input image data in a well-known manner but in parallel through the pair of processing portions for the block 1 and block 2, respectively. Then, normally, after the image processing, the thus-obtained image data is transferred to a writing portion.

Figure 2:
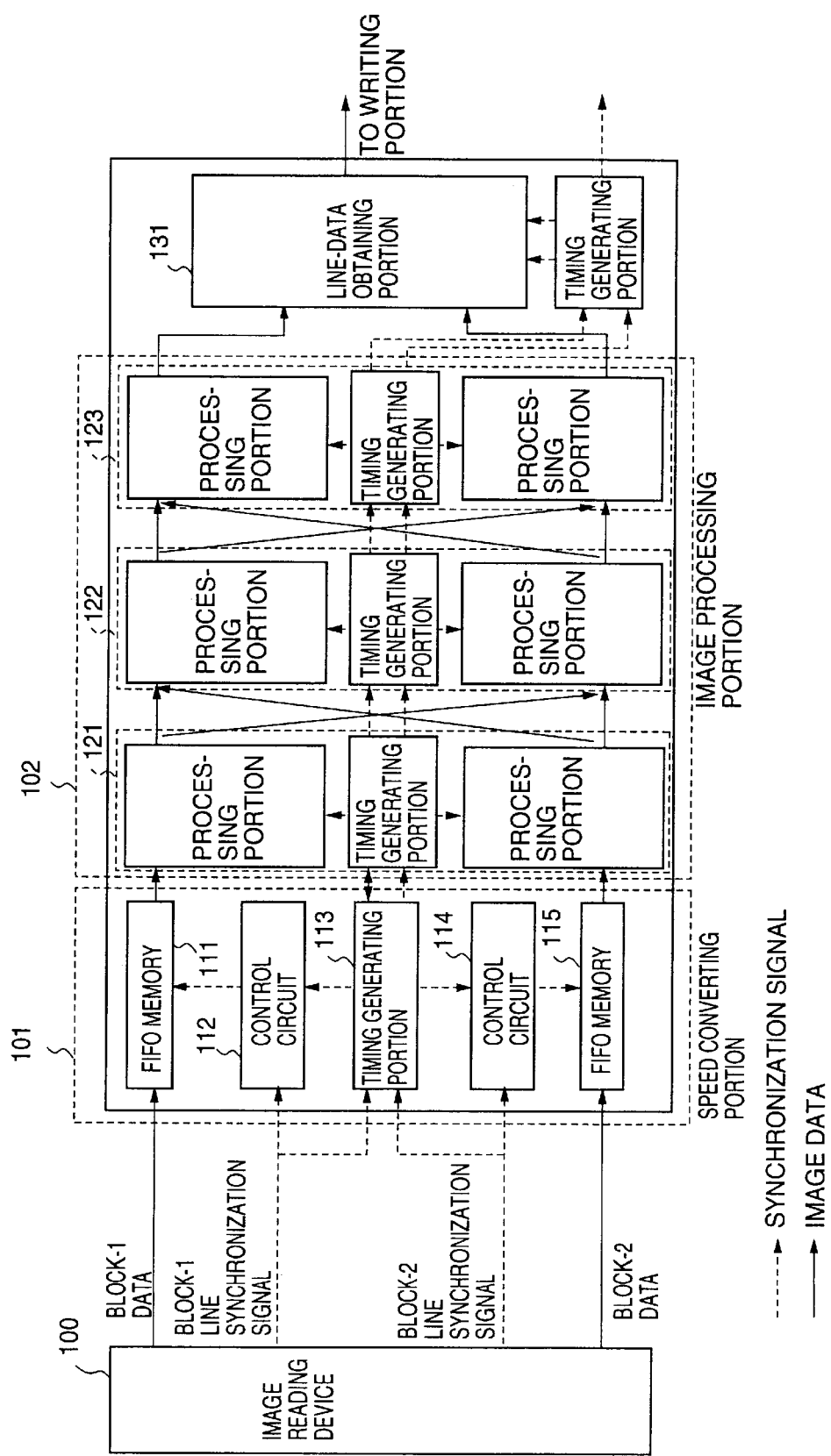
FIG. 2 is a block diagram of an image processing device in a second embodiment of the present invention.

FIG. 2 is a block diagram of an image processing device in a second embodiment of the present invention. The image processing device including a speed converting portion 101 and an image processing portion 102 is provided subsequent to an image reading device 100.

The speed converting portion 101 includes a FIFO (First-In First-Out) memory 111, a first control circuit 112, a timing generating portion 113, a second control circuit 114, and a LIFO (Last-In First-Out) memory 115.

The image processing portion 102 includes a first image processing portion 121, a second image processing portion 122 and a third image processing portion 123.

The speed converting portion 101 and image processing portion 102 are the same as those in the above-described first embodiment, respectively.

Further, in the second embodiment, a line-data obtaining portion 131 is provided subsequent to the image processing portion 102.

As described in the description of the first embodiment, the image data is transferred to the writing portion after undergoing the image processing, normally. However, as in the second embodiment shown in FIG. 2, there is a case where the line-data obtaining portion 131 obtains one line of image data, and the-thus-obtained image data is output. The line-data obtaining portion 131 performs processing of outputting one line of image data in each period of the line synchronization signal used for each block, obtained as a result of combination of the block 1 of image data and the block 2 of image data, on which all the image processing is performed.

FIG. 9 shows the bit arrangement of image data for one pixel.

In the second embodiment, as shown in FIG. 9, image processing is performed in quantization levels of 8 bits. That is, it is possible to express the tone level in the range of 0 through 255.

FIG. 10A shows the bit arrangement of image data for each pixel after the image processing is performed on the image data by the image processing portion 102. FIG. 10B shows the bit arrangement of image data when the image data is transferred in parallel.

Normally, when image processing is performed on image data, the number of bits for each pixel is reduced through further quantization. In this case, assuming that the number of bits for each pixel is reduced so as to becomes 2 as shown in FIG. 10A as a result of the image processing being performed on the image data by the image processing portion 102, it is possible to shorten the period of the line synchronization signal for each block of image data to be half (T0/2) the original one, as shown in FIG. 10C, and, also, to decrease the frequency of the pixel clock to be half the original one, as a result of the image data being transferred in parallel through a 8-bit bus, as shown in FIG. 10B. When the blocks 1 and 2 of image data in this condition are combined, it is possible to obtain each line of image data without changing the period of the line synchronization signal from the original one (T0), as shown in FIG. 10D, the pixel clock for transferring the image data being half the original one. A time generating portion is provided which receives the line synchronization signals for the blocks 1 and 2 of image data output from the third image processing portion 123, generates the appropriate line synchronization signals and provides them to the line-data obtaining portion 131, and to the writing portion, respectively.

In the second embodiment, the different synchronization signals are used for the divided blocks of image data, respectively, and the difference in timing at the time of data transfer (skew in FIG. 3) is absorbed by the FIFO memory 111 and LIFO memory 115, and, then, image processing is performed on the image data.

Thus, it is possible to perform a plurality of types of image processing at high speed.

FIG. 11 shows a block diagram of an image processing device in a third embodiment of the present invention.

The same reference numerals are given to portions the same as those in the first embodiment shown in FIG. 1 and descriptions thereof will be omitted.

A fourth image processing portion 124, and a fifth image processing portion 125 are image processing portions which receive the line synchronization signals from the third image processing portion 123, and perform image processing different from that performed by the first, second and third image processing portions 121, 122 and 123. In this embodiment, the fourth image processing portion 124 performs half-toning processing on the input image data in a well-known manner but in parallel through a pair of processing portions included therein for the block 1 and block 2, respectively. The fifth image processing portion 125 performs masking processing on the input image data in a well-known manner but in parallel through a pair of processing portions included therein for the block 1 and block 2, respectively. Further, similar to the timing generating portions included in the first, second and third image processing portions 121, 122 and 123, a timing generating portion included in each of the image processing portions receives the line synchronization signals from the preceding stage, generates appropriate line synchronization signals and provides them to the pair of processing portions, respectively, and to the subsequent stage. A sixth image processing portion 126 combines image data provided from image producing portions 141-1 and 141-2 with image data which has undergone processing through the fifth image processing portion 125. The sixth image processing portion 126 has image-combination processing portions 126-1 and 126-2 for processing the block 1 and block 2 of image data, respectively, and, the thus-obtained block 1 and block 2 of image data are output in synchronization with the line synchronization signals through output I/F 142-1 and 142-2, respectively. A timing generating portion included in the sixth image processing portion 126 receives the line synchronization signals from the fifth image processing portion 125, generates appropriate line synchronization signals and provides them to the image-combination processing portions 126-1 and 126-2, respectively, FIG. 17 illustrates one example of image combination.

For the sake of easy understanding, it is assumed that an image 200 (an image output from the fifth image processing portion 125) is a blank image (digital value: 0), and an image 201 which is combined with the image 200 has black portions (digital value: 255) at both sides thereof. In this case, the output image 202 is obtained as a result of the combination, as shown in FIG. 17.

Figure 18:
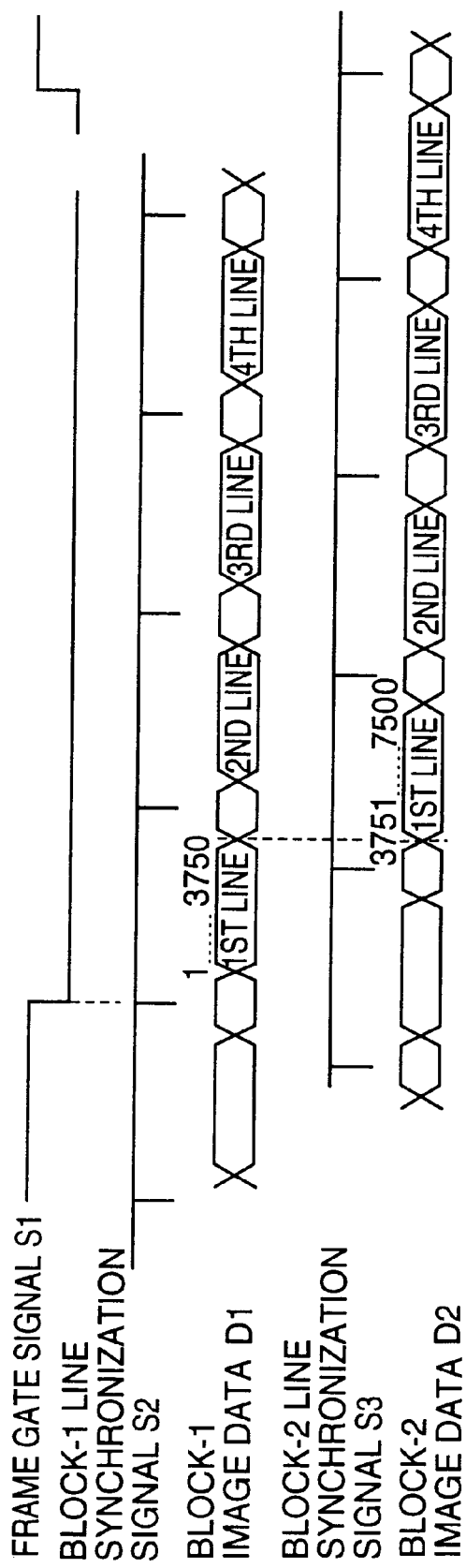
FIG. 18 shows synchronization signals output from an image processing portion, and timing of image data.
Figure 19:
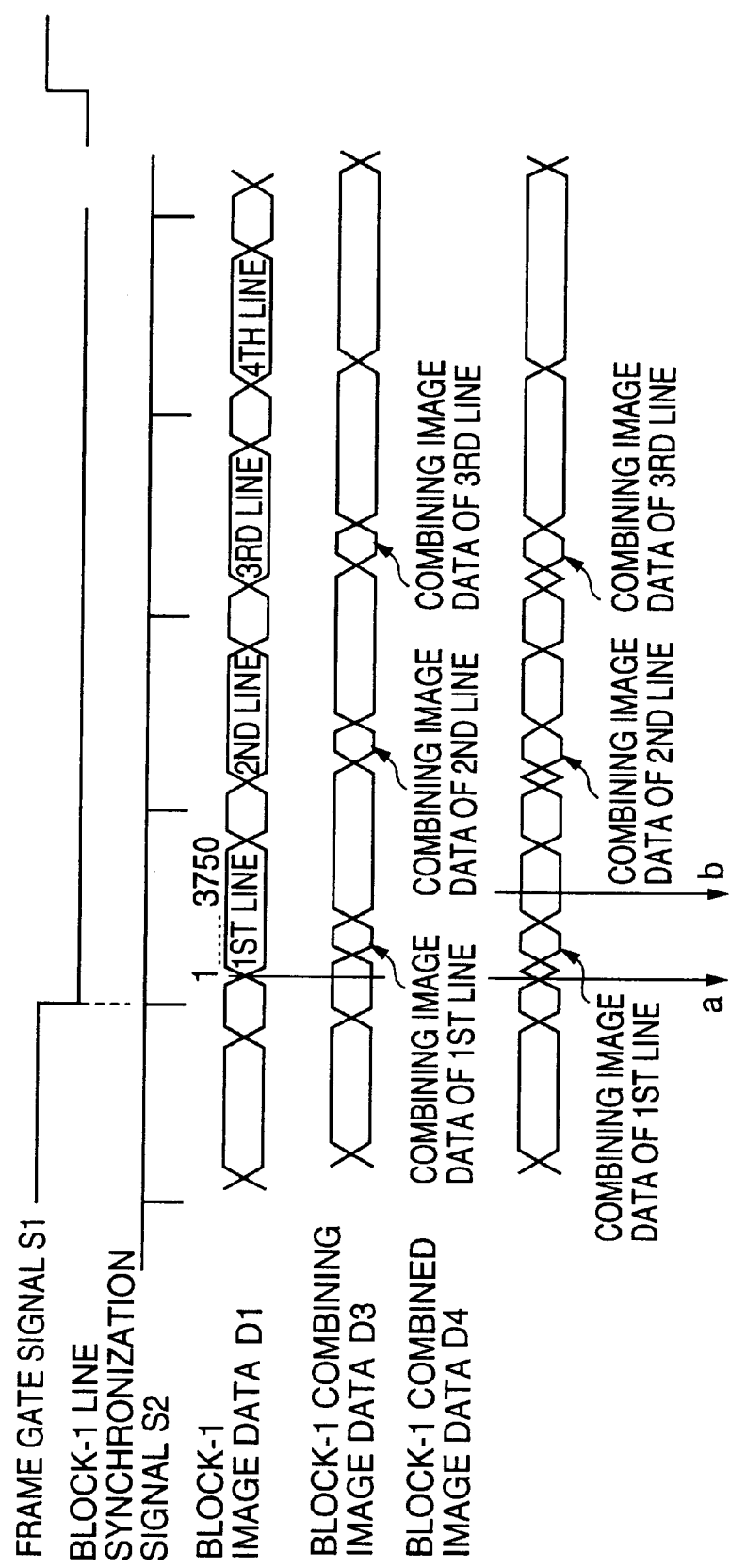
FIG. 19 shows sub-scan-direction image-combination timing.
Figure 20:
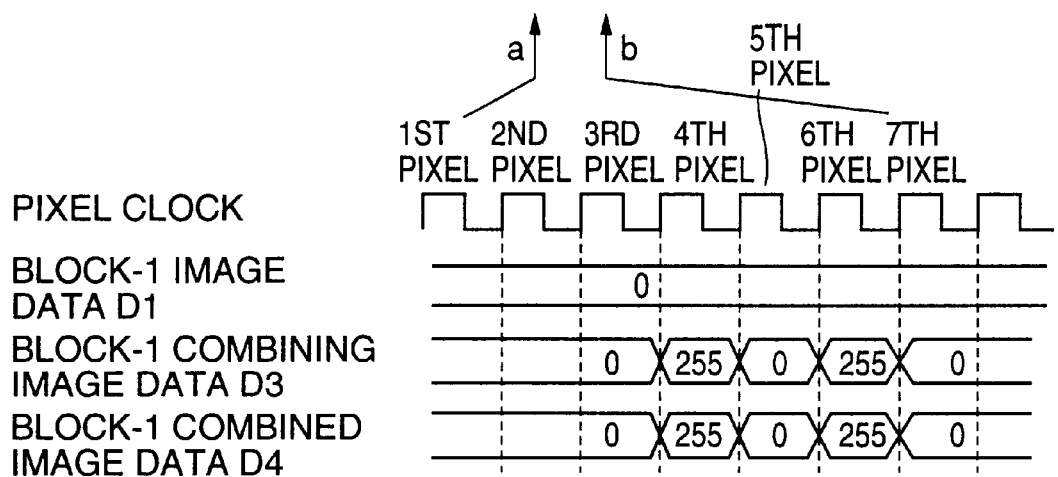
FIG. 20 shows main-scan-direction image-combination timing.

FIG. 18 shows synchronization signals output from the fifth image processing portion 125, and timing of image data output from the fifth image processing portion 125. FIG. 19 shows sub-scan-direction combination timing. FIG. 20 shows main-scan-direction combination timing. These figures show a frame gate signal S1, a block-1 line synchronization signal S2, a block-2 line synchronization signal S3, a block-1 image data D1, a block-2 image data D2, a block-1 combining image data D3 and a block-1 combined image data D4 (see FIG. 11).

Timing of the combination will now be described making reference to FIGS. 18–20. The block 1 is the first half of before-combination image data, and the block 2 is the latter half of before-combination image data. In this embodiment, combination is performed only on the first half. Therefore, only the combination timing of the block 1 of image data will now be described.

FIG. 18 shows timing of the output of the fifth image processing portion 125. In this embodiment, in all the image processing portions, the frame gate signal changes in synchronization with a decay edge of the line synchronization signal S2 for the block 1. Further, timing of the block 1 and block 2 is such that, as shown in the figure, the rear end of the data of line 1 of block 1 and the front end of the data of line 1 of block 2 are connected. Thereby, it is easy to obtain one line of data in the second image processing portion 122. Because this operation does not directly relate to the present invention, detailed description will be omitted.

The image data from the image producing portion 141-1 is output in predetermined timing in synchronization with the block-1 line synchronization signal provided from the fifth image processing portion 125. In this example, the data of the image to be combined, which image is of 3 pixels×3 pixels, is output from the image producing portion 141-1, starting from the fourth pixel in the main scan direction in the first line. The block-1 combining image data D3 is output from the image producing portion 141-1, as being 255, 0, 255, starting from the fourth pixel in the main scan direction in the first line, for three lines successively, as shown in FIG. 17, and, after that, 0 is output (see FIG. 20). The pixel clock shown in FIG. 20 is a synchronization signal in the main scan direction In this embodiment, the image data having a larger digital value is selected and thus output. Therefore, because the combined data D4 (combination result) is repeated for three lines as shown in FIG. 19, the output 202 shown in FIG. 17 is obtained. The method for producing a combined image is not limited to the above-mentioned method in which simply image data having a larger digital value is selected and thus output. The image data D3 of the image to be combined with the image data D1 output from the fifth image processing portion 125 is previously prepared in a memory of the image producing portion 141-1.

Figure 12:
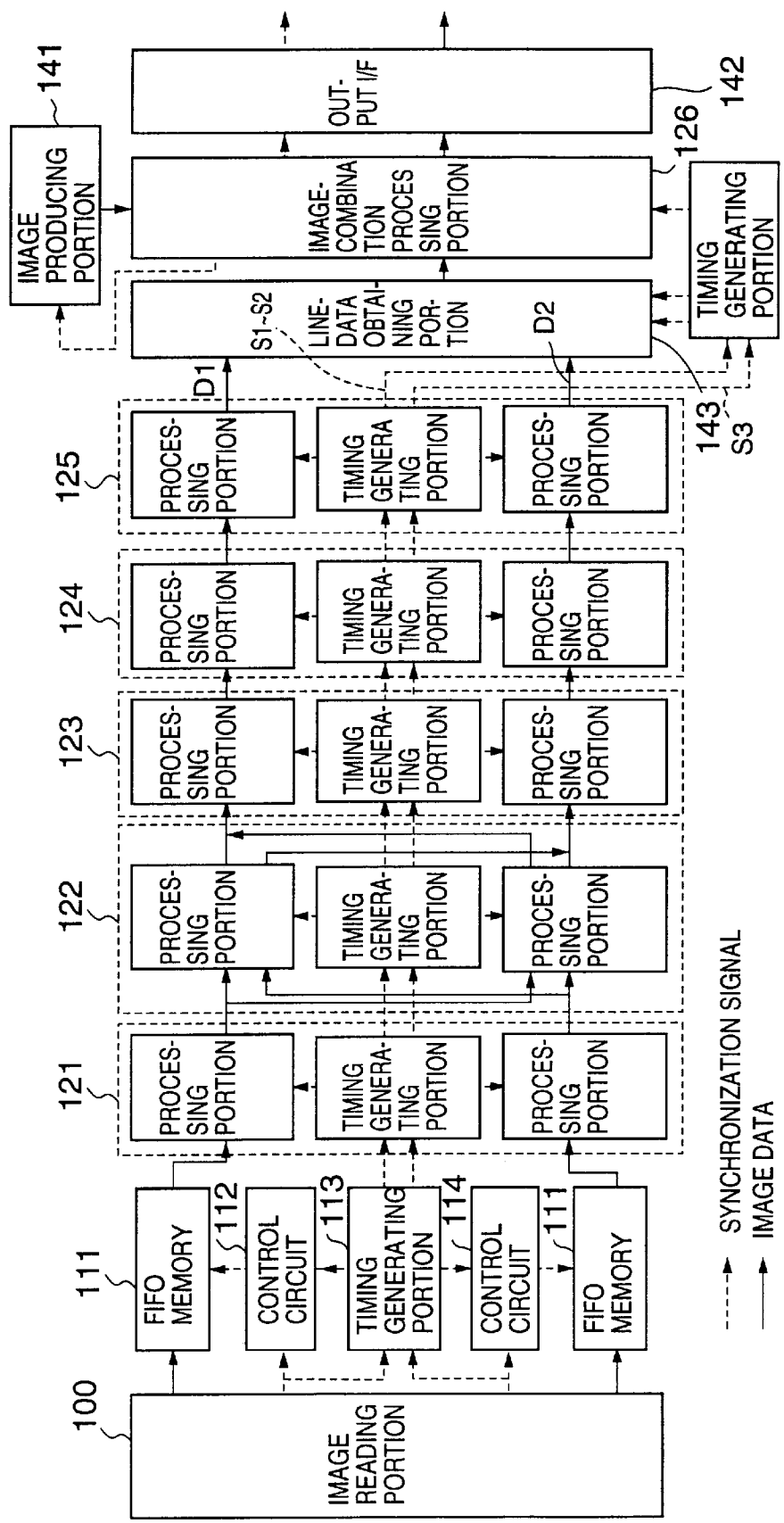
FIG. 12 shows a block diagram of an image processing device in a fourth embodiment of the present invention.

FIG. 12 shows a block diagram of an image processing device in a fourth embodiment of the present invention.

In this embodiment, the concept of the third embodiment is applied to the arrangement in which one line of image data is obtained from n blocks (2 blocks in the example shown in FIG. 12) of data, obtained as a result of one line being divided, through a line-data obtaining portion 143 and is output to an output I/F 142. Because an image-combination processing portion 126 is placed after the line-data obtaining portion 143, only one image producing portion 141 is needed, and, thereby, the costs can be lowered. The line-data obtaining portion 143 is the same as the line-data obtaining portion 131 shown in FIG. 2. The timing and manner of combining image data in this embodiment are substantially the same as those in the third embodiment shown in FIG. 11. A time generating portion is provided which receives the line synchronization signals for the blocks 1 and 2 of image data output from the fifth image processing portion 125, generates the appropriate line synchronization signals and provides them to the line-data obtaining portion 131, and to the image-combination processing portion 126, respectively.

Figure 13:
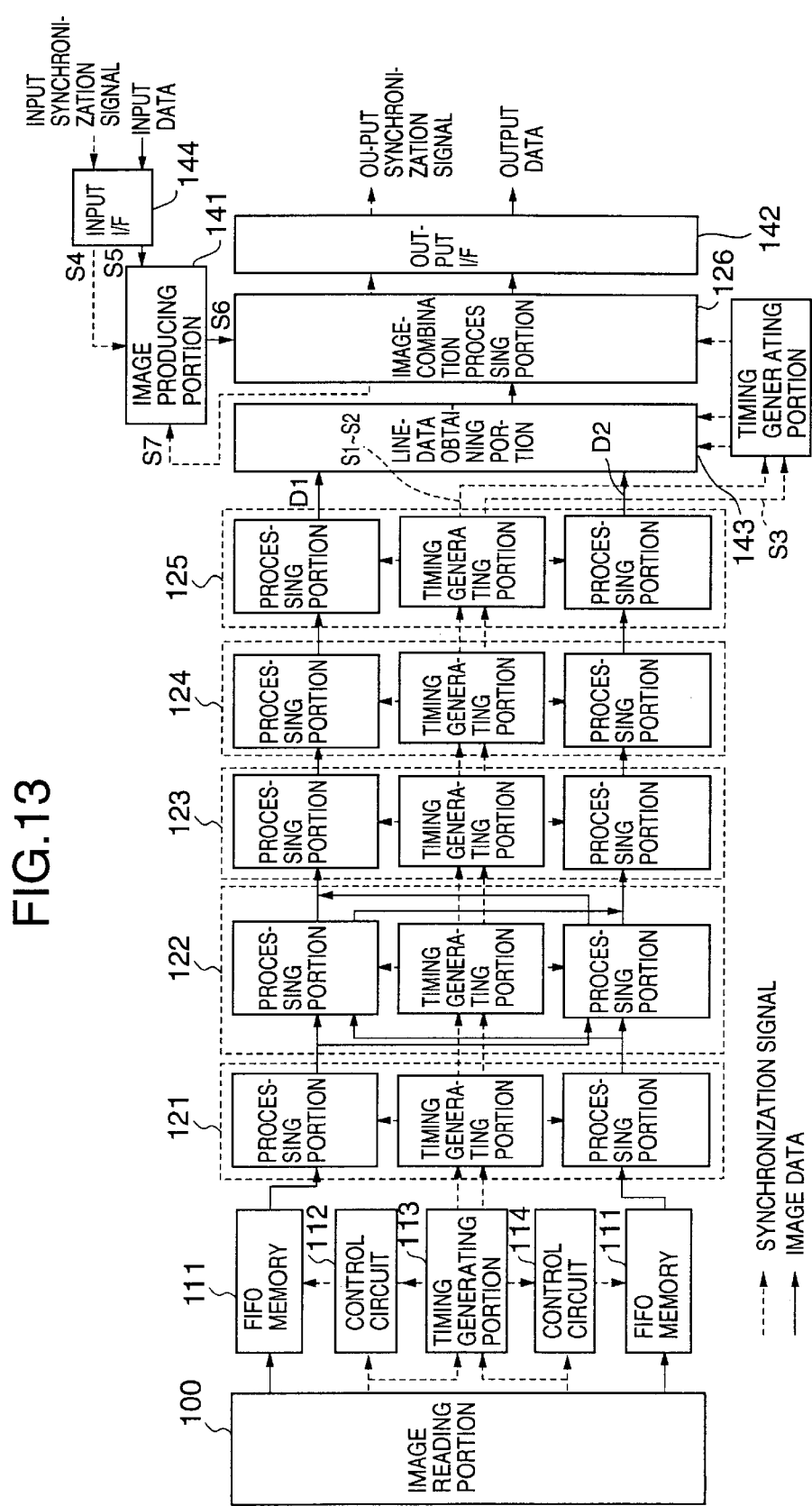
FIG. 13 shows a block diagram of an image processing device in a fifth embodiment of the present invention.
Figure 14:
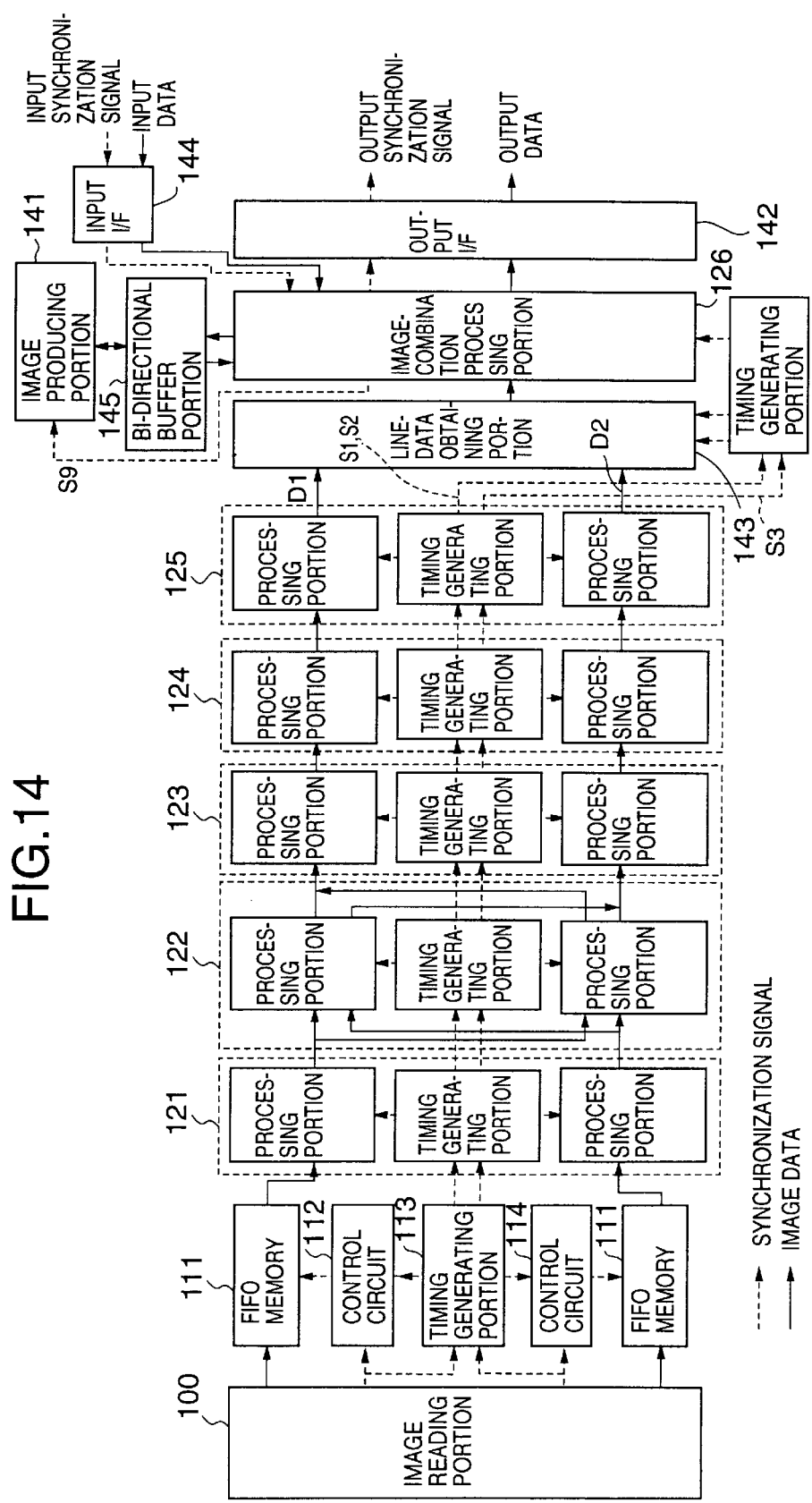
FIG. 14 shows a block diagram of an image processing device in a sixth embodiment of the present invention.

FIG. 13 shows a block diagram of an image processing device in a fifth embodiment of the present invention. FIG. 14 shows a block diagram of an image processing device in a sixth embodiment of the present invention. In each figure, the same reference numerals are given to portions the same as those shown in FIG. 12.

In each of these embodiments, the combining image data (to be combined with the image data output from the line-data obtaining portion 143) is input to the image producing portion 141 from the outside of the image processing device via an input I/F 144.

In the embodiment shown in FIG. 14, in comparison with the embodiment shown in FIG. 13, the number of wiring members is reduced as a result of a bi-directional data bus being used as the data bus between the image producing portion 141 and the image-combination processing portion 126. When the image processing device, including the line-data obtaining portion 143, image-combination processing portion 126, output I/F 142, input I/F 144 and a bi-directional buffer portion 145, is embodied as an LSI circuit and the image producing portion 141 is embodied as another LSI circuit, the area needed for wiring between these LSI circuits is reduced, and, as a result, the costs can be lowered.

Specifically, in the embodiment shown in FIG. 13, signal lines S4, S5, S6 and S7 are needed as the interface between the image processing device and the image producing portion 141. However, in the embodiment shown in FIG. 14, only signal lines S8 and S9 are needed as the interface between the image processing device and the image producing portion 141.

Figure 15:
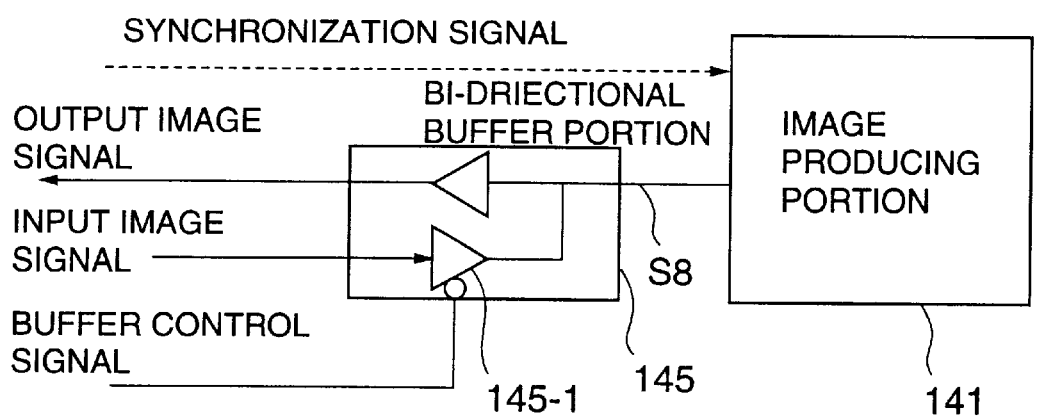
FIG. 15 is a block diagram showing an example of bi-directional control for an image producing portion.

FIG. 15 is a block diagram showing an example of bi-directional control for the image producing portion 141.

The bi-directional control is performed on image producing portion 141 by the bi-directional buffer portion 145 shown in FIG. 15. A buffer control signal provided to the bi-directional buffer portion 145 is controlled by an external controller, not shown in the figure. In accordance with the buffer control signal, when the image data is input to the image producing portion 141, a buffer 145-1 enters its conductive condition so as to allow the image data to be input to the image producing portion 141. In accordance with the buffer control signal, when the image data is output from the image producing portion 141, the buffer 145-1 enters its non-conductive condition so as not to allow the image data to be input to the image producing portion 141.

Figure 16:
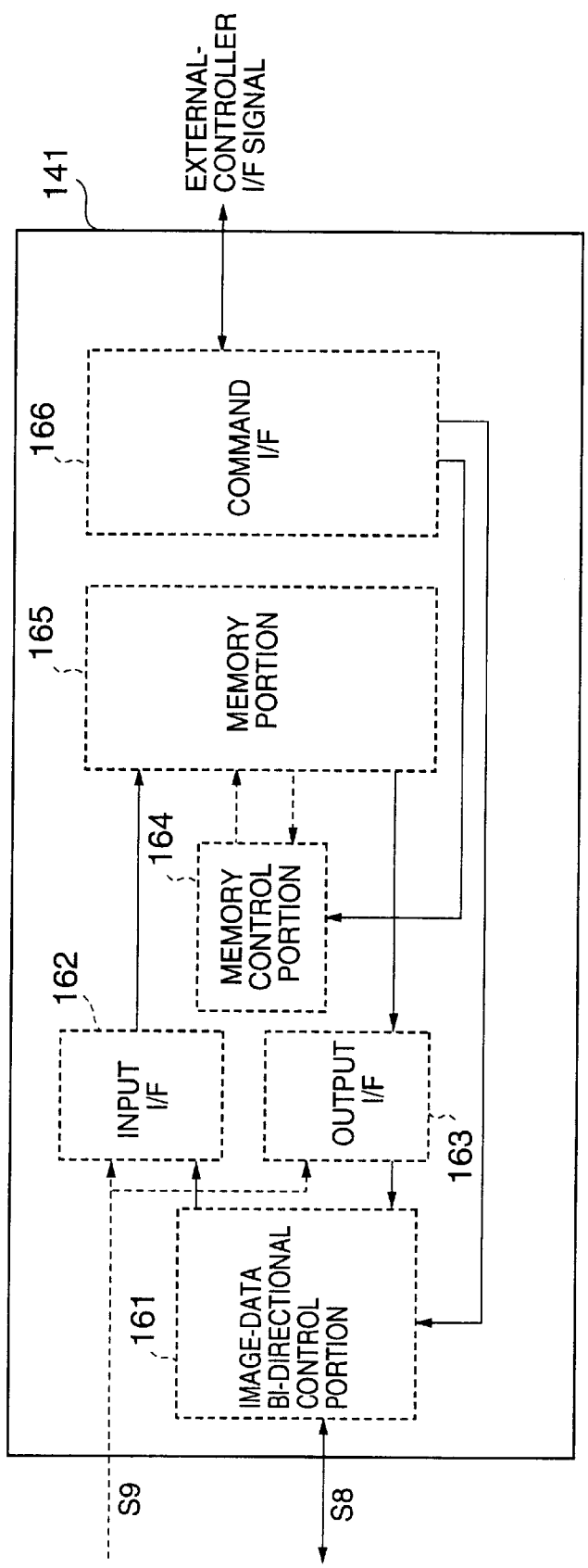
FIG. 16 is a block diagram of the image producing portion shown in FIG. 14.

FIG. 16 is a block diagram of the image producing portion 141 shown in FIG. 14.

Image data is stored in a memory portion 165. When the image data is output, an external controller, not shown in the figure, controls, via a command I/F 166, in order to cause the image data in the memory portion 165 to be output to the image processing device in synchronization with a synchronization signal transmitted through the line S9, a memory control portion 164 and an image-data bi-directional control portion 161. The thus-output image data is input to the image-combination processing portion 126 through the bi-directional buffer portion 145, shown in FIG. 15, and is combined with the image data which is the image data in line units obtained from the line-data obtaining portion 143. Reversely, image data (input data) from the input I/F 144 is input to the image-combination processing portion 126 in synchronization with the synchronization signal transmitted through the line S9, and, then, is input to the image producing portion 141 through the bi-directional buffer portion 145. The image producing portion 141 further includes an input I/F 162 and an output I/F 163, as shown in the figure.

Further, the present invention is not limited to the above-described embodiments and variations and modifications may be made without departing from the scope of the present invention.

The present application is based on Japanese priority application No. 11-023326, filed on Feb. 1, 1999, the entire contents of which are hereby incorporated by reference.

What is claimed is:

1. An image processing device which receives image data from an image reading device which divides each line of image data into 'n' blocks of image data, said 'n' being an arbitrary number, and transfers the 'n' blocks of image data in synchronization with respective synchronization signals, and performs predetermined image processing on the thus-received image data, said image processing device comprising:

a first image processing portion which, using respective synchronization signals for the 'n' blocks of image data, performs first predetermined image processing on the image data in parallel; and a second image processing portion which combines the 'n' blocks of image data in line units, and performs second predetermined image processing on the image data in parallel using synchronization signals, the period of each of which is 'n' times the period of each of the respective synchronization signals used by said first image processing portion.

2. The image processing device as claimed in claim 1, further comprising:

a third image processing portion which again divides each line of image data into 'n' blocks of image data, and performs third predetermined image processing on the image data in parallel using respective synchronization signals, the period of each of which is the original one; and a line-data obtaining portion which converts the 'n' blocks of image data output from said third image processing portion into parallel data so as to reduce the period of each of the respective synchronization signals to be 1/n times the original one, and, also, to decrease the frequency of a pixel clock, combines the 'n' blocks of image data in line units, and, transfers the thus-obtained image data in synchronization with a synchronization signal, the period of which is said original one, and, also, in synchronization with the pixel clock, the frequency of which is reduced.

3. An image processing device which receives image data from an image reading device which divides each line of image data into 'n' blocks of image data, said 'n' being an arbitrary number, and transfers the 'n' blocks of image data in synchronization with respective synchronization signals, said image processing device comprising:

an image processing portion which performs predetermined image processing on the image data received from said image reading device, and comprises a first processing portion which, using respective synchronization signals for the 'n' blocks of image data, performs first predetermined image processing on the image data in parallel, and a second processing portion which combines the 'n' blocks of image data in line units, and performs second predetermined image processing on the thus-obtained image data in parallel using synchronization signals, the period of each of which is 'n' times the period of each of the respective synchronization signals used by said first image processing portion; and an image-combination processing portion which performs processing of combining image data produced by an image producing portion and the image data output from said image processing portion.

4. The image processing device as claimed in claim 3, wherein:

said image processing portion further comprises a third processing portion which again divides each line of image data into 'n' blocks of image data, and performs third predetermined image processing on the image data in parallel using respective synchronization signals, the period of each of which is the original one; and said image-combination processing portion performs the processing of combining the image data produced by said image producing portion and the image data which is obtained as a result of the 'n' blocks of image data output from said third processing portion of said image processing portion being converted into a parallel data so as to reduce the period of each of the respective synchronization signals for the 'n' blocks of image data to be 1/n times the original one, and, also, to decreases the frequency of a pixel clock, the 'n' blocks of image data being combined, and, the thus-obtained image data being transferred in synchronization with a synchronization signal, the period of which is said original one, and in synchronization with the pixel clock, the frequency of which is reduced.

5. The image processing device as claimed in claim 3, further comprising an input interface for inputting image data to said image producing portion.

6. The image processing device as claimed in claim 3, wherein a single data bus is used for inputting the image data to said image producing portion, and, also, for outputting the image data from said image producing portion.

* * * * *